(12) United States Patent
Wu et al.

(10) Patent No.: US 7,746,401 B2
(45) Date of Patent: Jun. 29, 2010

(54) METHOD FOR ADJUSTING IMAGE DISPLAY RANGE OF A DOCUMENT CAMERA

(75) Inventors: Jiun-Shin Wu, Taipei (TW); Jung-Yu Chen, Taipei (TW); Yung-Hsi Wu, Taipei (TW); Po-Chih Hung, Taipei (TW)

(73) Assignee: Avermedia Information, Inc., Taipei (TW)

( * ) Notice: Subject to any disclaimer, the term of this patent is extended or adjusted under 35 U.S.C. 154(b) by 1044 days.

(21) Appl. No.: 11/425,184

(22) Filed: Jun. 20, 2006

(65) Prior Publication Data

US 2006/0285744 A1 Dec. 21, 2006

(30) Foreign Application Priority Data

Jun. 21, 2005 (TW) .............................. 94120671 A (51) Int. Cl.
*H04N 5/222* (2006.01)
(52) U.S. Cl. ................................. 348/333.01
(58) Field of Classification Search ................................
348/333.01–333.12, 373; 345/672–682; 382/173
See application file for complete search history.

(56) References Cited

U.S. PATENT DOCUMENTS

| | | | | |
|---|---|---|---|---|
| 6,515,704 B1 * | 2/2003 | Sato | ...................... | 348/333.11 |
| 7,058,204 B2 | 6/2006 | Hildreth et al. | | |
| 7,474,308 B2 * | 1/2009 | Deering | ...................... | 345/419 |
| 2003/0085988 A1 * | 5/2003 | Fujiwara | ...................... | 348/14.1 |
| 2003/0164890 A1 * | 9/2003 | Ejima et al. | ............... | 348/333.1 |
| 2003/0231259 A1 * | 12/2003 | Yui et al. | ...................... | 348/564 |
| 2005/0243073 A1 * | 11/2005 | Hashimoto et al. | ............ | 345/184 |
| 2006/0098873 A1 | 5/2006 | Hildreth et al. | | |
| 2006/0285744 A1 * | 12/2006 | Wu et al. | ...................... | 382/173 |

FOREIGN PATENT DOCUMENTS

| WO | 0079785 | 12/2000 |
|---|---|---|
| WO | 0229722 | 4/2002 |

* cited by examiner

*Primary Examiner*—Jason Chan
*Assistant Examiner*—Tuan H Le
(74) *Attorney, Agent, or Firm*—Kirton & McConkie; Evan R. Witt (57) ABSTRACT

A method is used with a document camera and an image display device for adjusting the image display range. The document camera includes an image synthesis controller and a graphics buffer. In the method, a first image frame and a second image frame are received by the image synthesis controller. In response to the image parallel display information, the graphics buffer is divided into a first region and a second region, and the image synthesis controller fills partial data of the first image frame and second image frame into the first region and the second region, respectively. In response to a change of the image parallel display information made by the user, the graphics buffer is divided into a third region and a fourth region, and the image synthesis controller fills partial data of the first image frame and second image frame into the third region and the fourth region, respectively. The data filled in the graphics buffer is then outputted to the image display device as a synthesized frame to be displayed.

9 Claims, 11 Drawing Sheets

METHOD FOR ADJUSTING IMAGE DISPLAY RANGE OF A DOCUMENT CAMERA

FIELD OF THE INVENTION

The present invention relates to an image display range adjusting method, and more particularly to a method for adjusting the image display range of simultaneously indicating a real-time image of a document camera and an image stored in a data file.

BACKGROUND OF THE INVENTION

In the commercial meetings or conferences of companies or schools, it is often needed to indicate some literal or graphical data during discussions or briefings. A document camera is thus popularly used to facilitate the presentation or discussion of a document, chart or academic thesis. Such a document camera is so-called a teaching material prompting machine, or, most commonly, an object-image projector.

A common object-image projector combines the functions of photographing, scanning, and image output of cameras or scanners. The photo module can be, for example, a digital video recorder, a digital statistic camera, a cell phone with a camera module, a monitor camera, or a PC camera. According to current technology, there are several available types of camera modules which are different in manufacturing processes, prices, sensitivities of pixels, sums of power consumption, etc. These camera modules can be classified as two main types, i.e. camera modules equipped with complementary metal-oxide semiconductor (CMOS) sensors and equipped with charged coupled device (CCD) sensors. The sensors act as the film of a conventional camera. A conventional camera film performs the development according to the change of the film resulted by a chemical reaction occurred according to light sensed by the film. On the other hand, image sensors such as the CMOS or CCD sensors, by utilizing the photo-electric converting effect, generate electric charges with a number variant with the intensity of sensed light, and thus form the current to be outputted.

However, according to different requirements, CMOS/CCD image sensors can be applied in different fields. Generally speaking, when compared with the CMOS image sensors, the CCD image sensors have maturer manufacturing technique and higher pixel number or dpi. Therefore, the CCD image sensors are often applied in digital statistic cameras or digital video recorder having middle/high level dpi. However, the CCD image sensors have defects of high power consumptions and prices. Furthermore, most manufacturing processes are stilled monopolized by Japanese manufacturers. On the other hand, although the CMOS image sensors have smaller dpi values than those of the CCD image sensors, the CMOS image sensors are benefited in capable of being manufactured in standard semiconductor manufacturing processes. Therefore, the CMOS image sensors can be manufactured in mass production. Furthermore, the CMOS image sensors are also benefited in their low power-consumptions and low prices. Therefore, the CMOS image sensors are wildly applied in the camera modules of cell phones and PC cameras, which do not need high dpi values. Consequently, the CMOS/CCD image sensors can be optionally selected to be the main structure of the camera module of an object-image projector according to the requirement of application. Except for capturing an image of a 3D object, the object-image projector can also be applied with image devices such as an image scanner or a fax machine which are capable of scanning documents or pictures to be projected to a project screen via a common triple-beam/single-beam digital projector, or outputted to a monitor of a common television or computer system to undergo a live video of the image of the object to be projected.

Therefore, according to such an operation of the object-image projector, the users can directly present lecture notes, references, drawings or the like to the audiences on the monitor of a computer or a projecting screen without previously scanning or color/black-and-white copying these projecting object to the transparent projection slices. Hence, the object-image projector has not only reduced the loading of preparing the presentation materials, but also provided a greater convenience and flexibility for the users during the presentations.

Figure 1A:
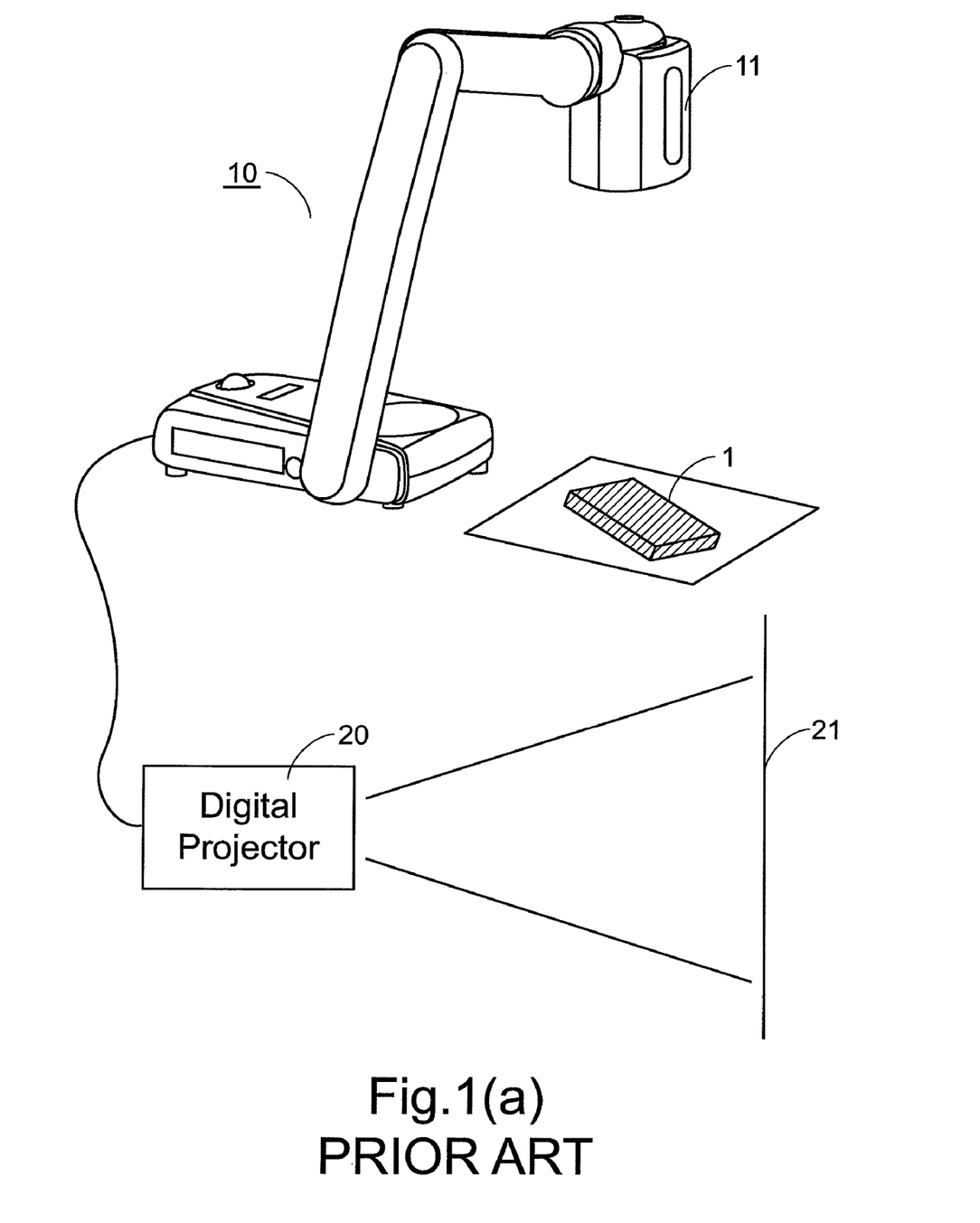
FIG. 1(a) schematically illustrates an operation of image indication of a presenting object via a conventional object-image projector.

Referring to FIG. 1(a), there is a conventional object-image projector 10 which indicates an image of a presenting object 1 on the project screen 21. The image of the presenting object 1 is obtained by capturing or scanning of the image-capturing module 11 (constructed mainly by the CCD or CMOS sensor) of the object-image projector 10 and then projected by a single-beam digital projector 20 to the project screen 21. In other words, a real-time video image of the presenting object 1 will be indicated on the project screen 21 once the presenting object 1 is placed in front of the image-capturing module 11. Preferably, there is a zoom lens on the image-capturing module 11 so as to zoom in or zoom out a certain portion of the presenting object 1 for facilitating the observation.

Figure 1B:
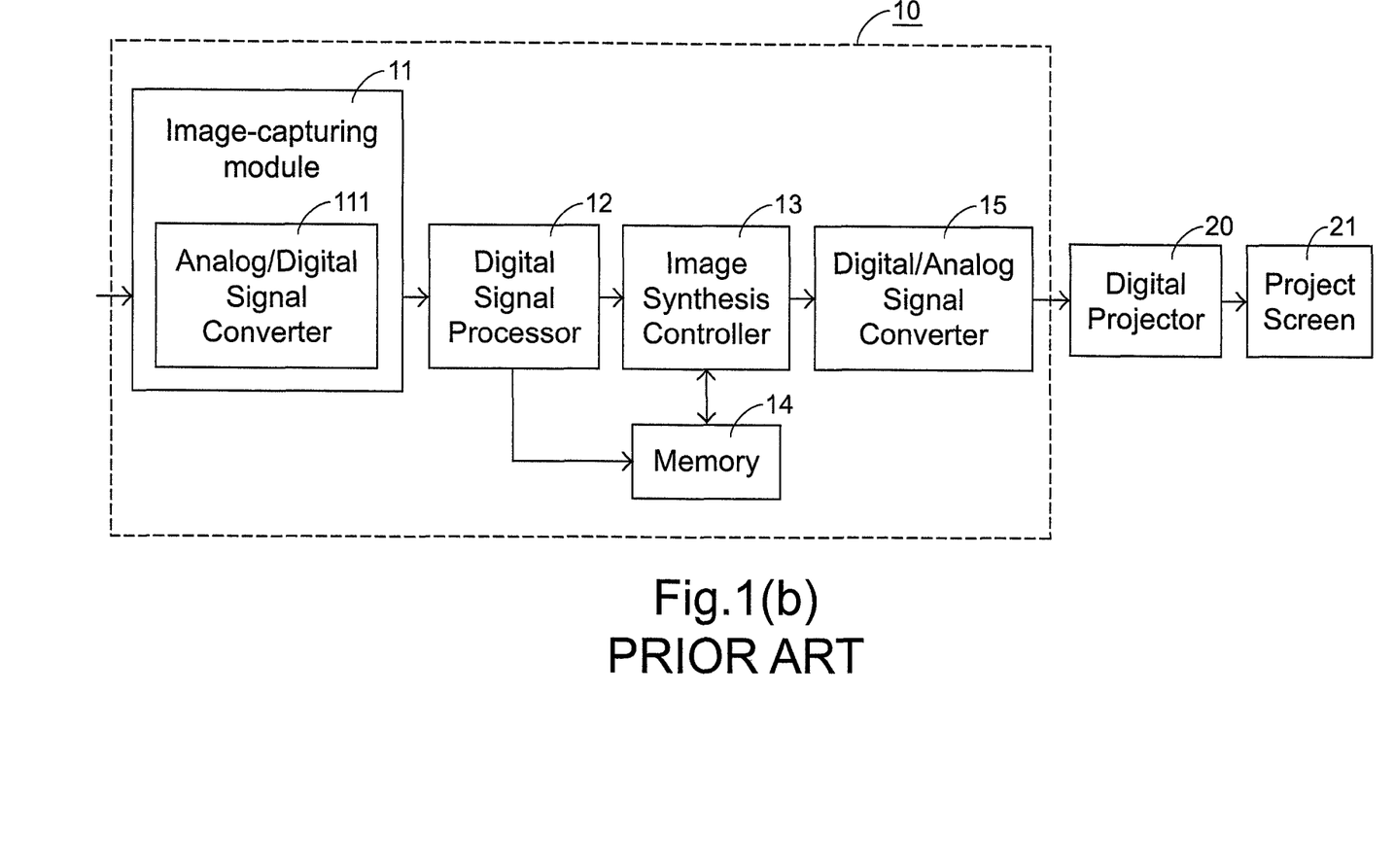
FIG. 1(b) is a system block diagram schematically illustrating an operation of a conventional object-image projector.

FIG. 1(b) illustrates a block diagram of the operation of the conventional object-image projector 10. The inside of the conventional object-image projector 10 includes a digital signal processor (DSP) 12, an image synthesis device 13, a memory 14, and a digital/analog converter 15. The image-capturing module 11 also includes an analog/digital converter 111 for converting the analog image signal into a digital format signal to be transferred to the DSP 12 to be processed. For example, the signal is processed after an image zoom-in or zoom-out, and the processed signal can be transferred to the image synthesis device 13 to be synthesized with other image. Furthermore, different images can be stacked up. Moreover, the image of the presenting object 1 captured or scanned by the image-capturing module 11 can be stored in the memory 14 in a picture or image file format after being processed by the DSP 12.

In other words, the image of the presenting object 1 can not only be real-time displayed, but also be synthesized with the other image stored in the memory 14. The image stored in the memory 14 can be an image of another presenting object previously captured by the image-capturing module 11. The synthesis of the real-time image and the previously stored image enables the user to display and compare the present/previous presenting objects. The synthesized image signal processed by the image synthesis device 13 is a digital signal and can be converted into an analog signal by the digital/analog signal converter 15 to be projected by the single-beam digital projector 20 to the project screen 21.

Figure 1C:
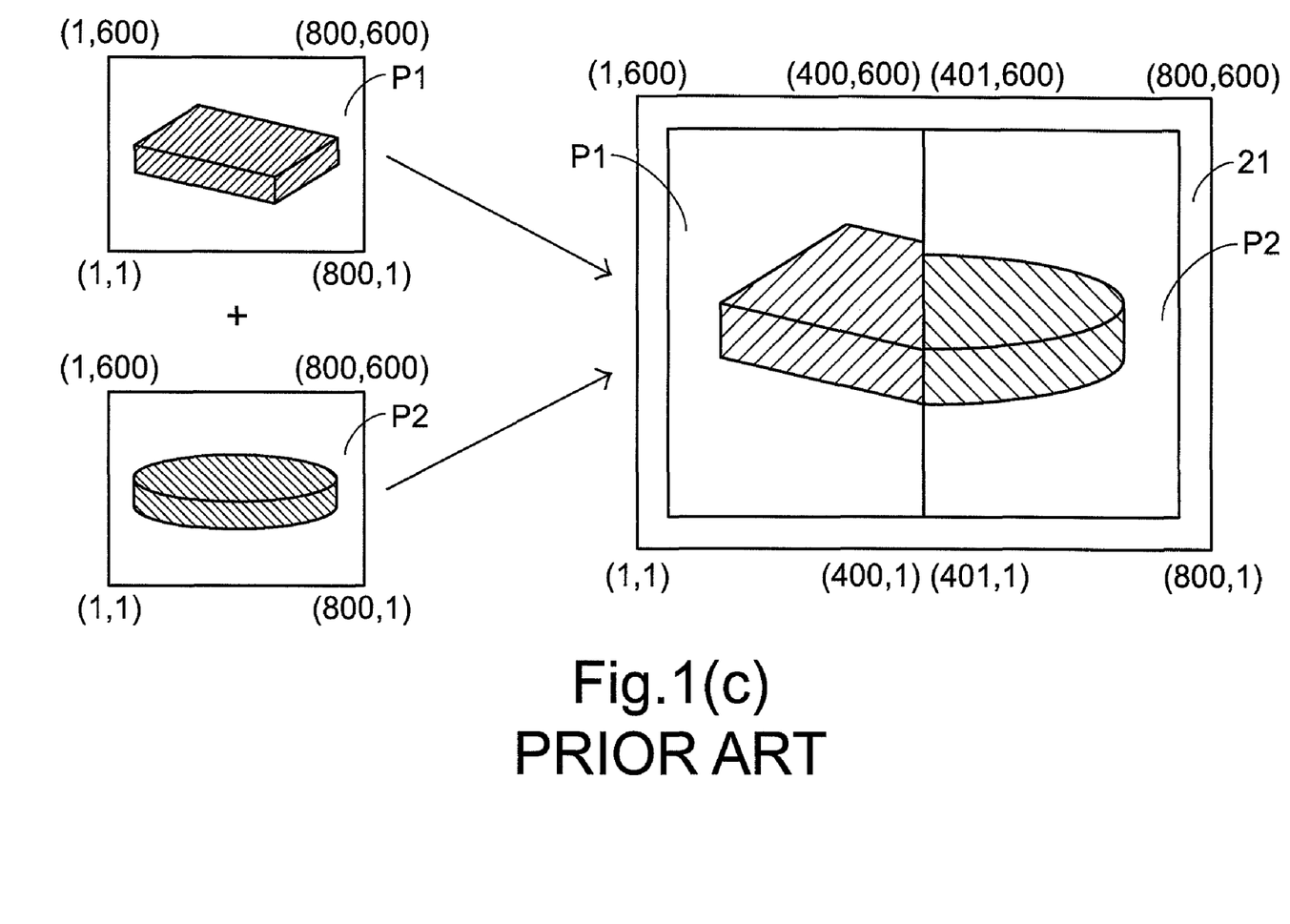
FIG. 1(c) and 1(d) illustrates two image frames simultaneously indicated on a project screen via a conventional object-image projector.
Figure 1D:
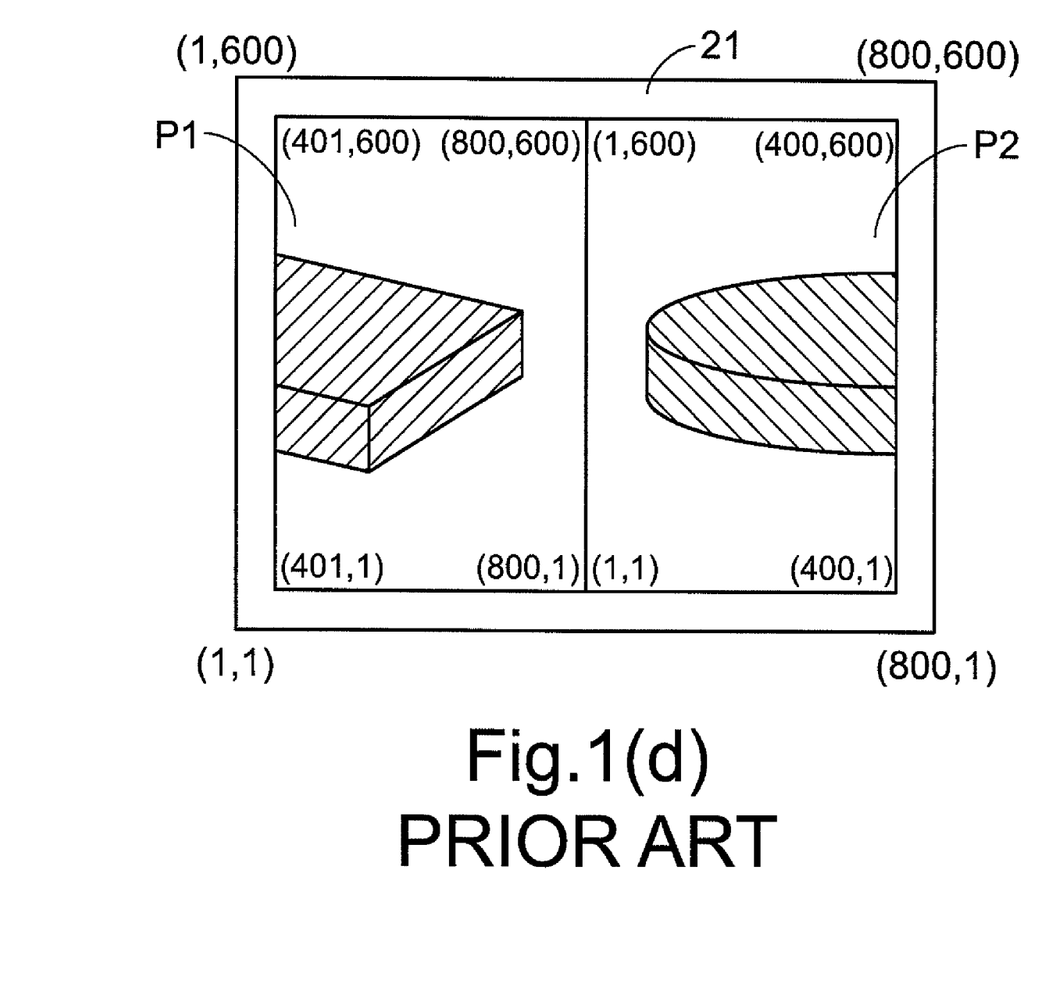

However, according to the current prior art, the synthesis image frame of the real-time image of the presenting object 1 and the previous image stored in the memory 14 is often processed by the electronic panning, i.e., the synthesis image frame are evenly divided into two portions for displaying both images. An example of the synthesis image frame is shown in FIGS. 1(c) and 1(d), the conventional object-image projector 10 indicates two image frames simultaneously on the project screen 21. As shown in FIG. 1(c), the synthesis image frame is constructed by an object image frame P1 indicated by an image captured from the presenting object 1, and a file image frame P2 indicated by an image read from a record file stored in the memory 14. In an example case, the object image frame P1, the file image frame P2, and the display range of the project screen 21 all have 800×600 pixels, and the initial coordinates are all (1, 1) as well. The left portion of the object image frame P1, i.e. pixels from (1, 1) to (400, 600) in P1, is indicated on the left portion of the project screen 21. Meanwhile, what is indicated on the right portion of the project screen 21 is the right portion of the file image frame P2, and the display range is from pixel (401, 1) to pixel (800, 600) of the file image frame P2.

It is observed that only a half of the object image frame P1 and only a half of the file image frame P2 can be indicated on the project screen 21. However, if it is desired to change the view scope of the object image frame P1 or the file image frame P2 on the project screen 21, e.g. change the view scope to the object image frame P1 to the right portion or change the view scope of the file image frame P2 to the left portion so as to facilitate the observation or comparison of the two images, the only way in the conventional method is to apply the electronic panning on the image of the image frame P1 or P2 so as to shift the view scope of the image in the image frame to a desired range just as to scroll an image in a window. Such an operation can be performed via an operation interface of the object-image projector, e.g. a remote controller. According to the electronic panning, the user can, as shown in FIG. 1(d), indicate the right portion (from (401, 1) to (800, 600) of the object image frame P1 on the project screen 21, and the left portion (from (1, 1) to (400, 600)) of the file image frame P2. However, such an electronic panning can only change the view scope range other than the view scope size. In other words, the image in either the object image frame P1 or the file image frame P2 can only be observed in a scope size, in the maximum case, a half of the project screen 21. Such a limitation disadvantages the observation or comparison of the two images in both image frames. It is then attempted by the invention to solve the problems.

SUMMARY OF THE INVENTION

Therefore, the present invention provides a method for adjusting an image displaying range applied between a document camera and an image display device wherein the document camera includes an image synthesis controller and a frame buffer; the method comprising steps of: receiving a first image frame defined by an first image data and a second image frame defined by a second image data by the image synthesis controller; dividing the frame buffer into a first area and a second area according to an image parallel-displaying information, and loading a first portion of the first image data and the second image data into the first area and the second area respectively by the image synthesis controller; inputting a change of the image parallel-displaying information for re-dividing the frame buffer into a third area and a fourth area accordingly, and loading a second portion of the first image data and the second image data into the third area and the fourth area respectively by the image synthesis controller; and outputting a synthesis image frame to the image displaying device to be displayed according to the data loaded in the frame buffer.

In an embodiment, the first image data of the first image frame is obtained by sensing an image of a presenting object by the document camera.

In an embodiment, the document camera further includes a memory electrically connected to the image synthesis controller for storing therein an image file, and the second image frame is obtained by reading the image file via the image synthesis controller.

In an embodiment, the image file is obtained by capturing or scanning an image of an object by the document camera.

In an embodiment, the frame buffer is constructed by a plurality of pixels arranged in q lines and each of the q lines has p pixels, and the image parallel-displaying information includes a partition line defined at a first position beside pixel p/2 of the p pixels of the q lines to divide the frame buffer into the first area and the second area, wherein the first area and the second area have the same size in an initial state.

In an embodiment, the first portion of the first image data and the second image data includes a plurality of pixels of the first image frame arranged in q lines each of which has p/2 pixels and a plurality of pixels of the second image frame arranged in q lines each of which has p/2 pixels, and the image synthesis controller is capable of executing an electric panning method to load a third portion of the first image data and the second image data into the first area and the second area to be indicated.

In an embodiment, the change of the image parallel-displaying information is to move the partition line from the first position beside the p/2 pixel to a second position beside the p/2−n pixel or the p/2+n pixel of the p pixels of the q lines so as to re-dividing the frame buffer into the third area and the fourth area, wherein n is an integer smaller or equal to p/2.

In an embodiment, when the partition line is moved, a portion of one of the first image frame and the second image frame is replaced by a portion of the other one of the first image frame and the second image frame in the synthesis image frame.

In an embodiment, the image synthesis controller is capable of executing an electric panning method to loading a fourth portion of the first image data and the second image data into the third area and the fourth area to be indicated.

In an embodiment, the first area and the second area or the third area and the fourth area are capable of being loaded therein image frame data from respective image signal sources different from each other, and the first area and the second area or the third area and the fourth area are covering all image frame indicating ranges of the frame buffer.

In an embodiment, the image synthesis controller combines a first indicating portion of the first image frame and a second indicating portion of the second image frame into the image synthesis frame and loads image data corresponding to the image synthesis frame to be indicated.

In an embodiment, the image displaying device is a display or a single/triple-beam digital projector coupled with a project screen.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
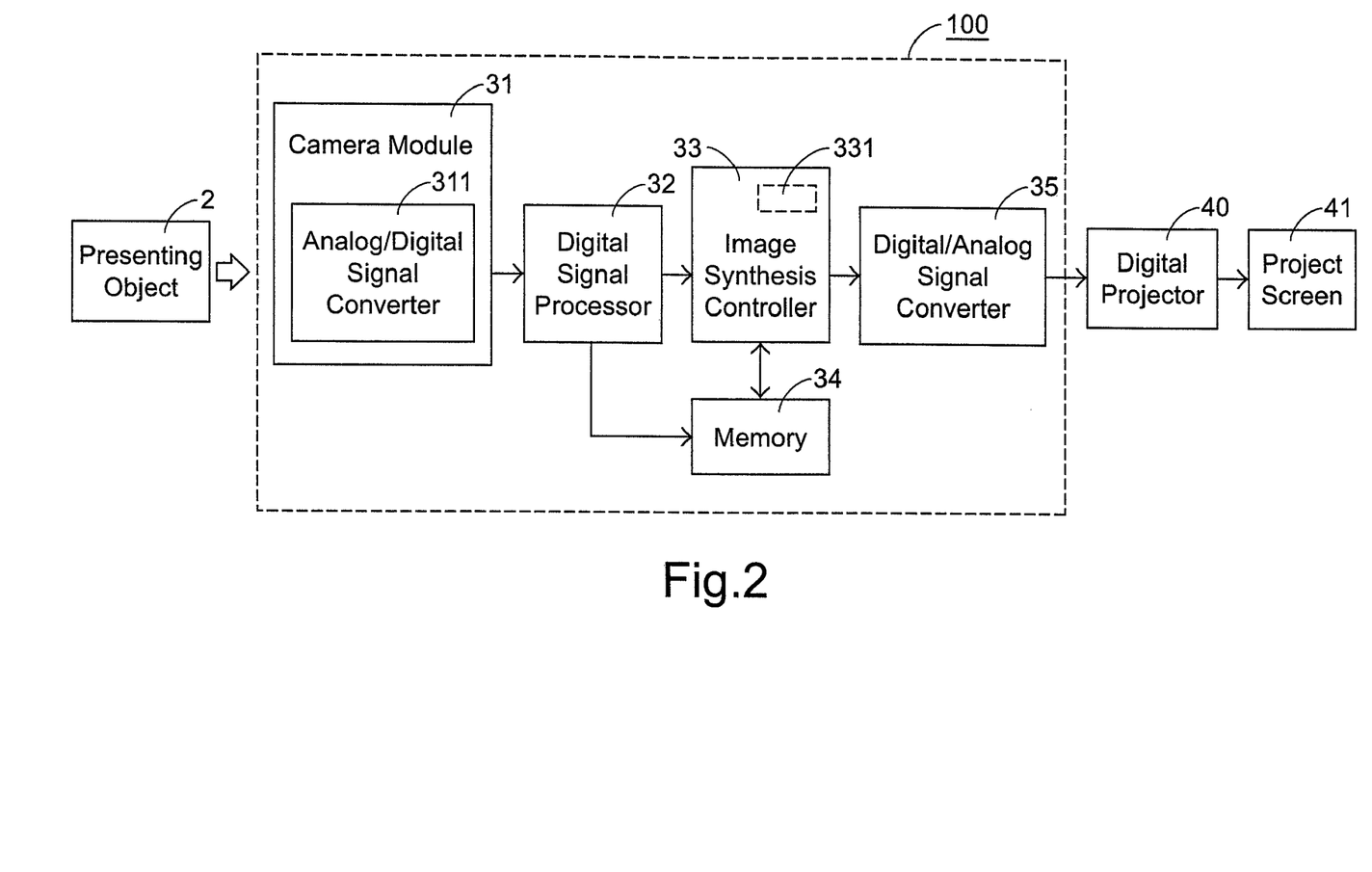
FIG. 2 is a system block diagram schematically illustrating an object-image projector 100 of a preferred embodiment according to the invention.

Refer to FIG. 2, which illustrates a system block diagram of an object-image projector 100 of a preferred embodiment of the invention. In this embodiment, the document camera of the invention is represented by the object-image projector 100. The object-image projector is applied between a presenting object 2 and an image displaying device. The image displaying device is constructed by a display or a single-beam/triple-beam projector together with a project screen. In this embodiment, a single-beam digital projector 40 coupled with a project screen 41 are taken as an example of the image displaying device of the invention. Furthermore, the presenting object 2, in this preferred embodiment, can be a flat paper sheet having a document size, pictures, lecture notes, or a 3D-object or 3D-model, etc.

It is known from FIG. 2, in such a preferred embodiment, the inside of the object-image project 100 includes a camera module 31, a digital signal processor 32, an image synthesis controller 33, and a memory 34. The camera module 31 senses the image of the presenting object 2 and generate a real-time image signal to be outputted. The camera module 31 can be a CCD or CMOS image sensor as has been disclosed in the description of the background. Therefore, such a type of image sensor will generate a photoelectric effect to output the image signal. Furthermore, the camera module 31 further includes an analog/digital signal converter 311 for converting the analog real-time image signal into a digital signal format and outputting the converted signal to the digital signal processor 32 to be processed. Therefore, an object image frame representing the image of the presenting object 2 is generated and received by the image synthesis controller 33. In this embodiment, the object image frame is used for representing a first image frame of the invention.

Furthermore, referring to FIG. 2, the memory 34 is electrically connected to the digital signal processor 32 and the image synthesis controller 33 capable of executing signal transmissions. Therefore, an object image captured or scanned by the image capturing module 31 can be processed by the digital signal processor 32 and then stored in the memory 34 in a picture/image file format. Consequently, in this embodiment, an image file stored in the memory 34 is read by the image synthesis controller 33 to form a file image frame. Such a file image frame is used for presenting the second image frame of the invention.

Referring to FIG. 2, there is further a frame buffer 331 in the image synthesis controller 33. In the preferred embodiment, the image synthesis controller 33 receives the object image frame and the file image frame for overlapping and synthesizing the two image frames according to a desired displaying range. The desired image frame data to be indicated is then loaded into the frame buffer 331. The data loaded in the frame buffer 331 is then converted by the digital/analog signal converter 35 into an analog format signal capable of being read by the single-beam digital projector 40 and outputted by the single-beam digital projector 40 as a synthesis frame showing on the project screen 41. In other words, what is loaded into the frame buffer 331 will be exactly indicated on the project screen 41 via the single-beam digital projector 40.

FIG. 3 is a functional block diagram schematically illustrates the frame buffer 331. It is known form the above description that the object-image projector 100 projects the image to the project screen 41 according to the image data loaded in the frame buffer 331. Therefore, the image frame outputted on the project screen 41 can be changed by changing the data loaded in the frame buffer 331. Generally speaking, an image frame data stored in the frame buffer 331 can be represented by p*q pixels. In an 800×600 pixels image frame, p equals to 800 and q equals to 600. The display range of the frame buffer 331 is from pixel (1, 1) to pixel (800, 600). The frame is constructed by several (q) horizontal scan lines. Each of the scan lines is constructed by several (p) pixels. Data of these pixels is recorded in the frame buffer 331 for indicating the image frame.

Figure 3A:
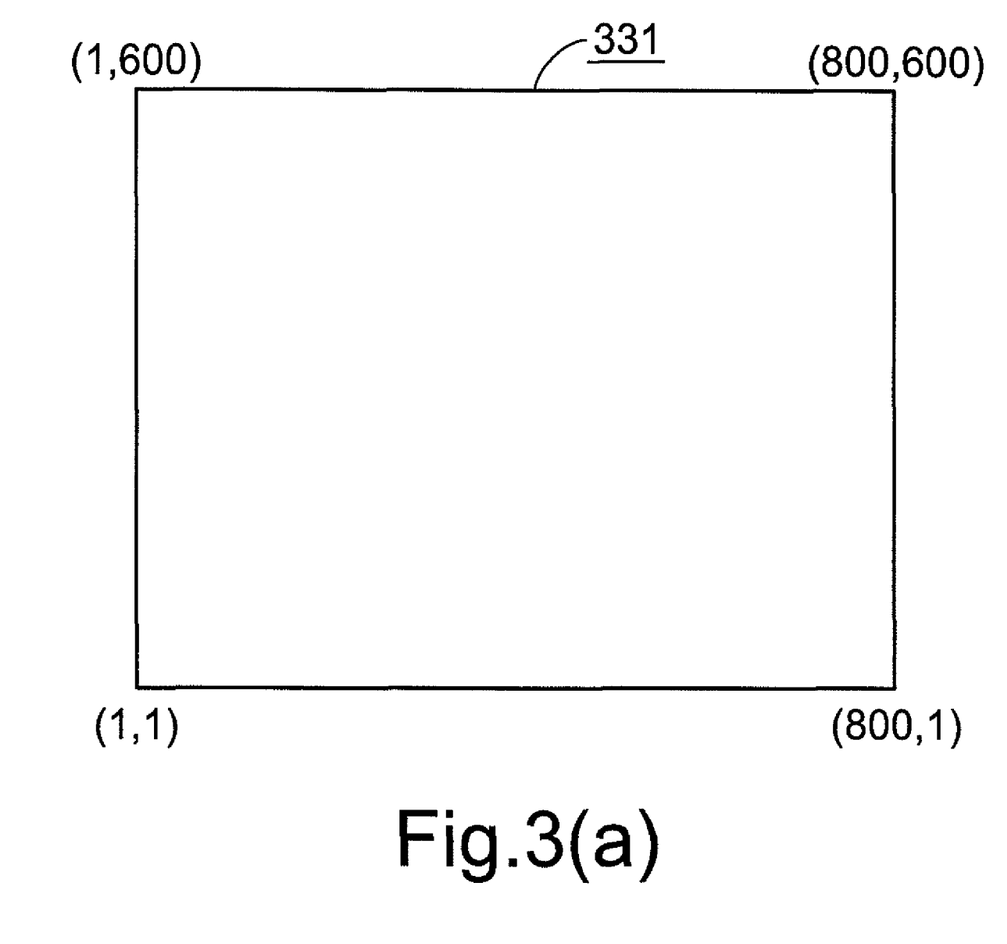
FIG. 3(a) is a block diagram schematically illustrating a frame buffer 331 of a preferred embodiment according to the invention.
Figure 3B:
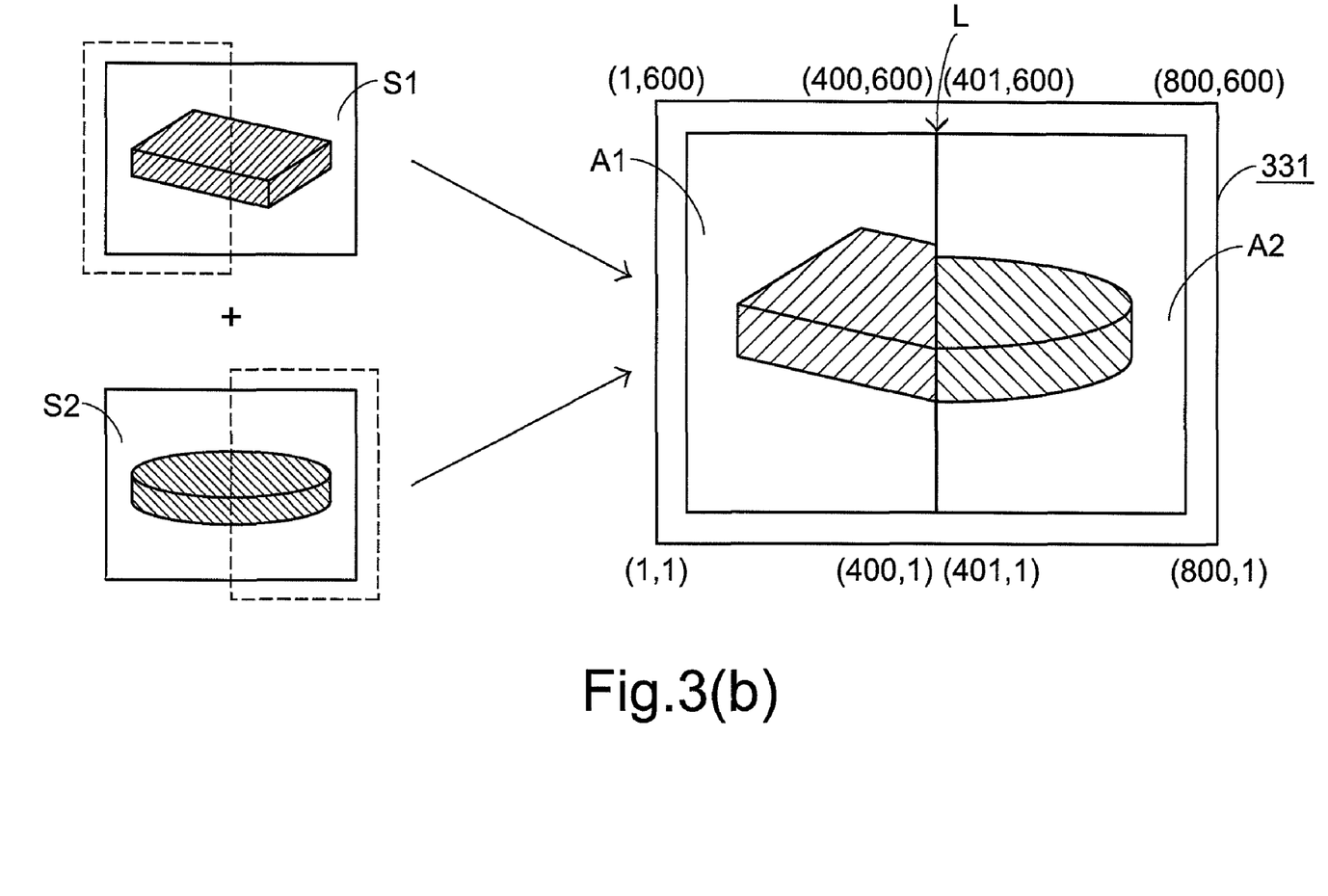
FIGS. 3(b) to 3(e) schematically illustrate an image synthesis of an object image frame S1 and a file image frame S2 via the image synthesis controller 33 in the frame buffer 331 of a preferred embodiment according to the invention.

FIGS. 3(b)-3(e) schematically illustrate the process for synthesizing the object image frame S1 and the file object image S2 via the image synthesis controller 33. In this prefer embodiment, the image synthesis controller 33 receives the object image frame S1 and the file image frame S2 firstly. According to the image parallel-displaying information, the frame buffer 331 is divided by the image synthesis controller 33 a first area A1 and a second area A2 as shown in FIG. 3(b). Furthermore, the image data of a portion of the object image frame S1 and the file image frame S2, as the portions marked by the dash lines in FIG. 3(b), are loaded into the first area A1 and the second area A2 respectively.

The above-mentioned image parallel-displaying information is the information for executing the image parallel-displaying function of the object-image projector 100. Such an image parallel-displaying function is similar to the function of the prior art capable of simultaneously displaying and comparing two image frames. A partition line L, having an initial setup value the same as what is setup in the prior art, is defined at the position beside the pixel p/2, i.e. the location between the 400th pixel and the 401th pixel of a scan line in this embodiment. As shown in FIG. 3(b), the partition line L in such an initial position divides the frame buffer 331 into two even parts having the same size: the first area A1 and the second area A2.

Figure 3C:
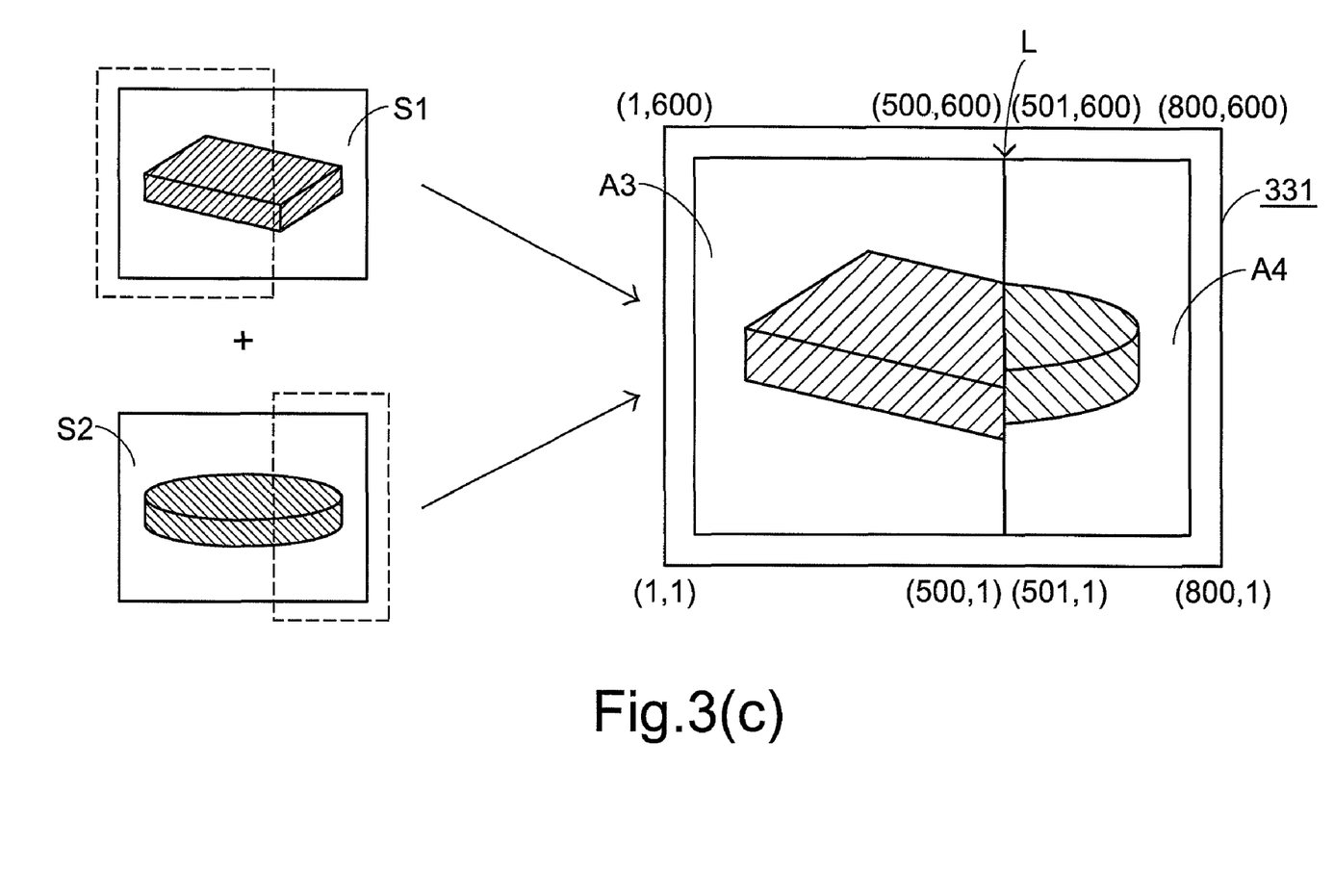

A key feature of the invention is that, according to an change to the above-mentioned image parallel-displaying information made by a user via a user interface device, the first and second areas A1 and A2 having equal size to each other may be re-divided into a third area A3 and a fourth area A4 which have different sizes. The user interface may be a remote controller (not shown) collocated to be used with the single-beam digital projector 40, and the change may be made by operating the left/right shifting keys to adjust the image frame desired to be shown by the user. Image data from different image sources can be respectively loaded into the first area A1 and the second area A2, or the third area A3 and the fourth area A4. The whole display range of the image frame to be indicated from the image data stored in the frame buffer 331 is constructed by the first area A1 plus the second area A2, or the third area A3 plus the fourth area A4. The data loaded in the frame buffer 331 is the content to be indicated in the synthesis image frame. As shown in FIG. 3(c), the image data of a portion of the object image frame S1 and a portion of the file image frame S2 (i.e. the portions marked by dash lines in FIG. 3(c)) is loaded into the third area A3 and the fourth area A4. Consequently, the synthesis image frame is outputted on the project screen 41 according to the data loaded in the frame buffer 331.

Figure 3D:
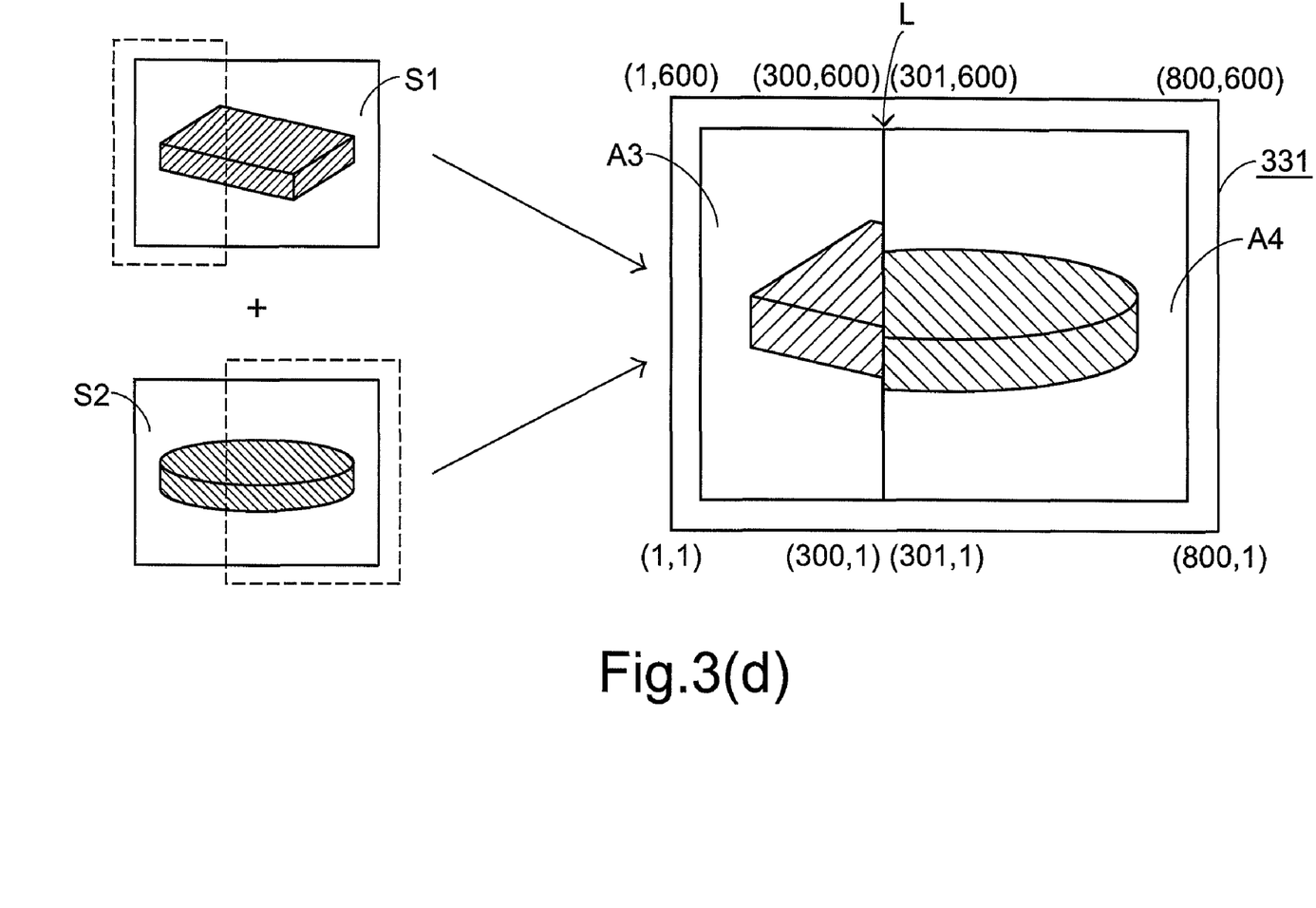

The above-mentioned change of the image parallel-displaying information is used for adjusting the display range of a portion of the object image frame S1 and a portion of the file image frame S2 which are parallel-displayed. For example, as shown in FIG. 3(c), in a 800×600 pixels image frame, the partition line L is moved from the position between the 400th and 401th pixels (the position beside the pixel p/2, i.e. the middle point of the p pixels in the scan line) to the position between the 500th and 501th pixels (the position beside the pixel p/2+n, wherein n=100). In another example, as shown in FIG. 3(d), the partition line L is moved forward to the position between the 300th and 301th pixels (the position beside the pixel p/2−n, wherein n=100). Consequently, the frame buffer 331 is divided into two different-sized areas, i.e. the third area A3 and the fourth area A4. In each case, n is an integer smaller than or equal to p/2. Therefore, when n equals to p/2, the whole frame buffer 331 stores image data of only one image frame, i.e., only the image of the object image frame S1 or the file image frame S2 is stored in the frame buffer 331. It is then observed that the parallel image frame can be changed by changing the position of the data partition for different image frame sources in the frame buffer 331.

The parallel-displaying of the object image frame S1 and the file image frame S2 can be started at the state similar to that in the prior art. Initially, the frame buffer 331 is partitioned into two even-sized areas for being loaded therein partial data of the object image frame S1 and the file image frame S2. The loaded data may come from the areas of the images marked by dash lines indicated in FIG. 3(b). Both of the marked areas of the object image frame S1 and the file image frame S2 abstracted by the image synthesis controller 33 have a size of 400 pixels in length and 600 pixels in width. The abstracted data of image is loaded into the first area A1 and the second area A2, respectively. Of course, both the view scopes (i.e. the areas marked by dash lines in FIG. 3(b)) of the object image frame S1 and the file image frame S2 can be "shifted" or adjusted by electronic panning for the user to see the other portions of the object image frame S1 and the file image frame S2. In such a situation, the image data corresponding to the new view scopes is loaded into the frame buffer without changes of the first and second areas A1 and A2.

However, it is possible to change the view scope range of the object image frame S1 and the file image frame S2 since the position of the partition line L in the invention is movable and adjustable by adjusting the sizes of the data-loading areas of the object image frame S1 and the file image frame S2 in the frame buffer 331. When changing the position of the partition line L, some portion of a certain image frame will become invisible while another portion of the other image frame will become visible. In other words, in the synthesis image frame, the movement of the partition line L will change the visible/invisible portion of both the object image frame S1 and the file image frame S2 simultaneously. The portion of one image frame that becomes invisible will be swapped by the portion of the other image frame which becomes visible. For example, when the position of the partition line L is moving from the position indicated in FIG. 3(b) to that indicated in FIG. 3(c), it is seen that the pixels in the file image frame S2 from pixel (401, 1) to pixel (501, 600) is invisible and replaced by the pixels in the object image frame S1 at the same positions. In another case, the partition line L is moved from what is indicated in FIG. 3(b) to the position indicated in FIG. 3(d), the pixels ranged in pixel (301, 1) to pixel (401, 600) is changed from the pixels of the object image frame S1 into the pixels of the file image frame S2.

Figure 3E:
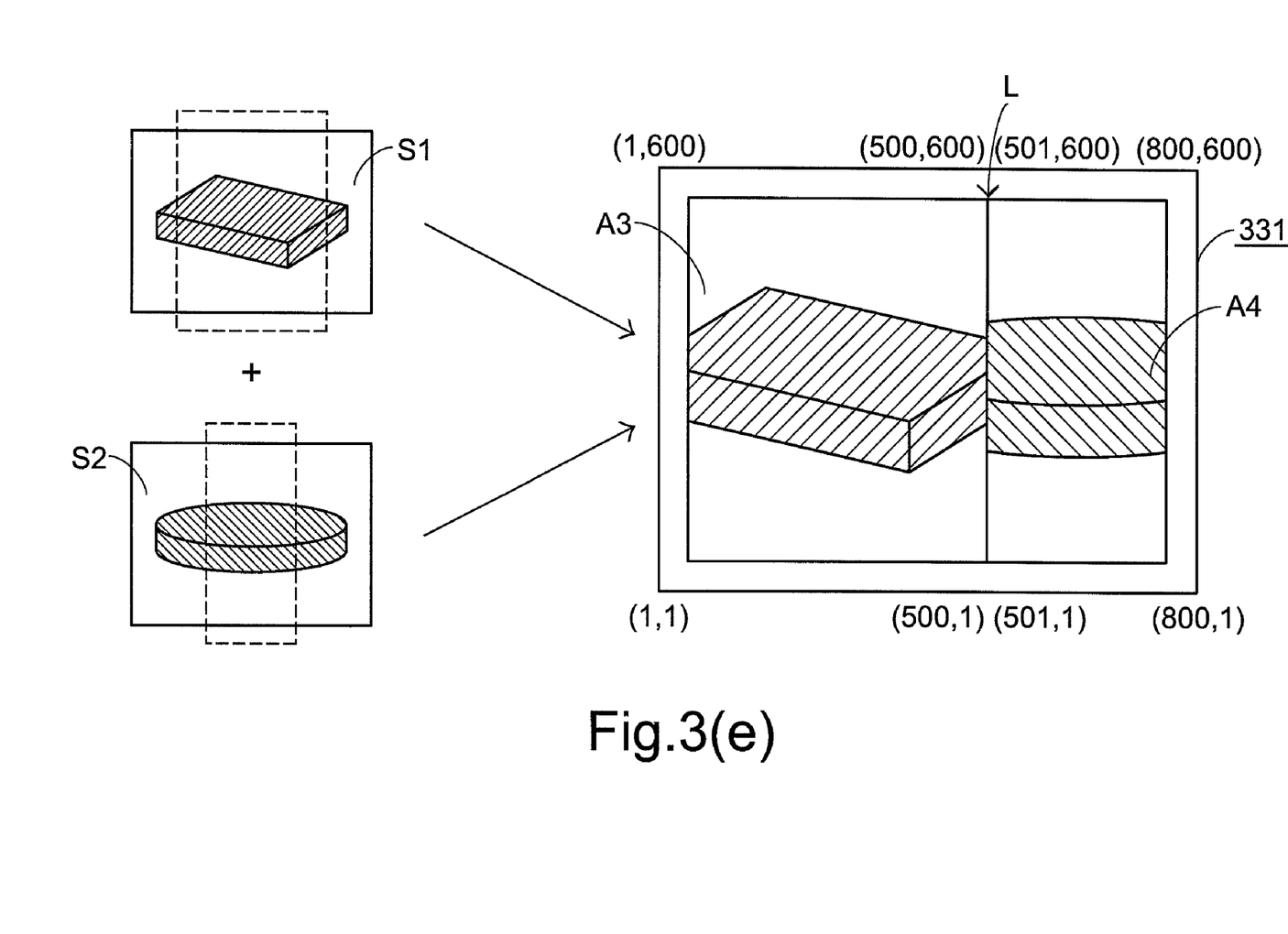

From the above descriptions, it is seen that the defect of the prior art is solved. In prior art, the maximum visible ranges of both parallel-displayed image frames in a synthesis image frame is only a half of the original image frames. By changing the view scopes of the two parallel-displayed image frames, a more clear comparison of both image frames can be obtained. Furthermore, the invisible portions of the object image frame S1 and the file image frame S2, which are not appeared in the first area A1 and the second area A2 or the third area A3 and the fourth area A4 shown in FIGS. 3(b), 3(c) and 3(d), can be viewed by the electrical panning via the image synthesis controller 33 to load the image data of the invisible portion into, for example, the third area A3 and the fourth area A4 to be indicated. Accordingly, as shown in FIG. 3(e), in the invention, it is not only possible to adjust the view scope sizes of the parallel-displayed image frames, but also to scroll the image frames to desired view ranges according to the user's requirement. Therefore, according to the inventive idea and the description of the preferred embodiment of the invention, both the view scope sizes and the view positions of the two parallel-displayed image frames can be changed so that the observation and the comparison between the two image frames can be done more clearly and more conveniently, and thus achieves the goal of the invention.

Figure 4:
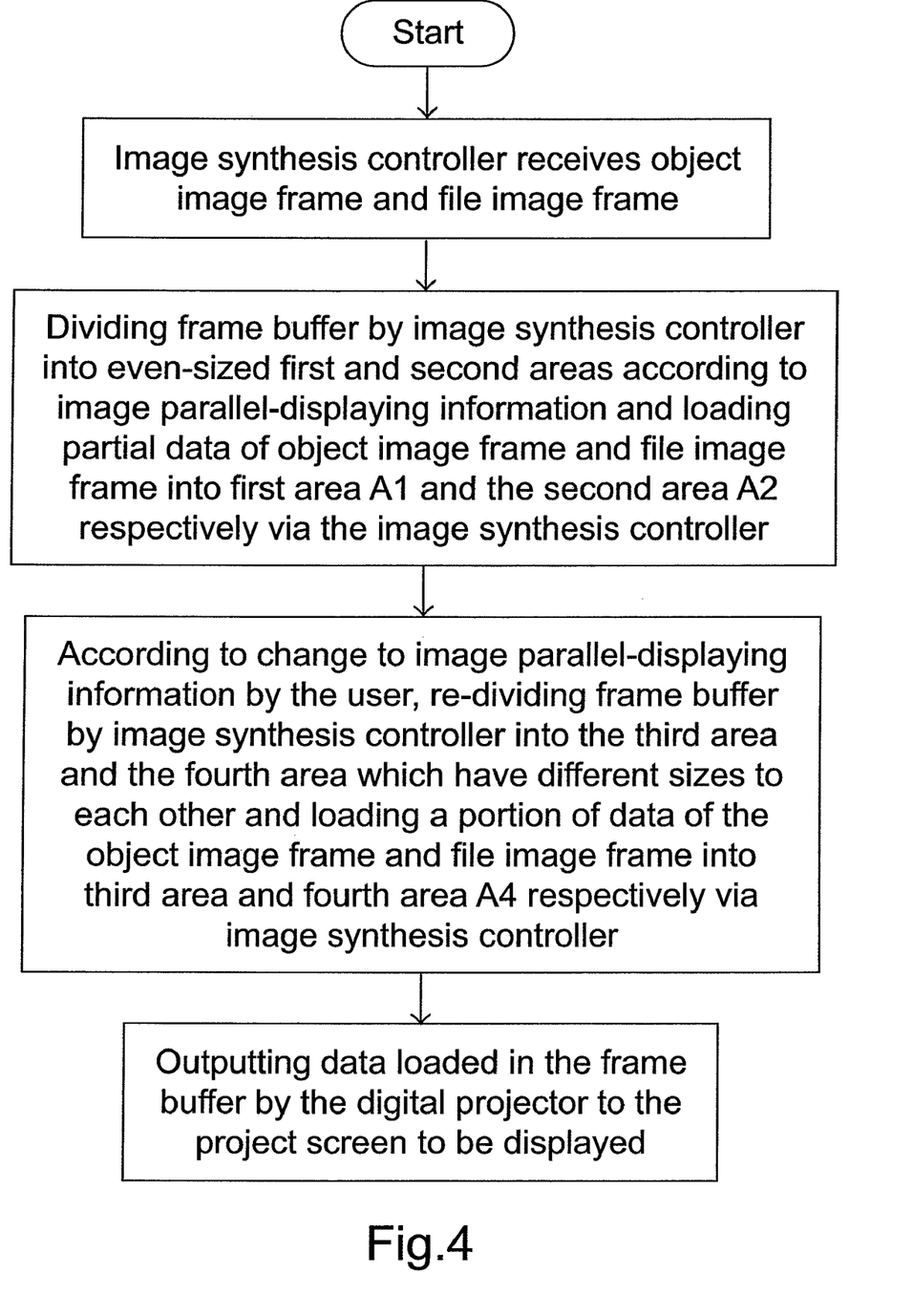
FIG. 4 is a flow diagram of a preferred embodiment according to the invention.

FIG. 4 schematically illustrates the flow diagram of the operation of the preferred embodiment of the invention. First of all, the image synthesis controller 33 receives object image frame S1 and the file image frame S2. Then, according to the image parallel-displaying information, the frame buffer 331 is divided by the image synthesis controller 33 into even-sized first and second areas A1 and A2. Partial data of the object image frame S1 and the file image frame S2 is loaded into the first area A1 and the second area A2 respectively via the image synthesis controller 33. According to the change to the image parallel-displaying information by the user, the frame buffer 331 is re-divided by the image synthesis controller 33 into the third area A3 and the fourth area A4 which have different sizes to each other. Again, a portion of the data of the object image frame S1 and the file image frame S2 is loaded into the third area A3 and the fourth area A4 respectively via the image synthesis controller 33. Finally, the data loaded in the frame buffer 331 is outputted by the single-beam digital projector 40 to the project screen 41 to be displayed.

To sum up, the invention provides an adjusting method during operating an object-image projector or a document camera to provide a diversified frame viewing scopes. The defect of the prior art that each of the parallel-displayed image frames can only be respectively displayed on the project screen in a size a half of the project screen when comparing two image frames is solved. Accordingly, the goal of the invention is achieved. While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting an image displaying range of a document camera on an image display device, said method comprising steps of:

providing a frame buffer;

receiving a first image frame defined by a first image data and a second image frame defined by a second image data;

executing an image parallel-displaying function to divide said frame buffer into a first area and a second area where a first portion of said first image data and a first portion of said second image data are loaded, respectively, so as to show a first synthesis image frame having a size equal to the size of said frame buffer and consisting of a first part of said first image frame and a first part of said second image frame with a first-position partition line therebetween; and executing another image parallel-displaying function to divide said frame buffer into a third area and a fourth area where a second portion of said first image data and a second portion of said second image data are loaded, respectively, so as to show a second synthesis image frame having a size equal to the size of said frame buffer and consisting of a second part of said first image frame and a second part of said second image frame with a second-position partition line therebetween;

wherein with the movement of a partition line from said first-position partition line to said second-position partition line, image data within a range defined between said first-position partition line and said second-position partition line are changed while image data beyond said range are kept unchanged.

2. A method according to claim 1 wherein said first image data is obtained while said document camera is sensing an image of an object being presented.

3. A method according to claim 1 wherein said second image data is previously stored as an image file in said document camera.

4. A method according to claim 3 wherein said image file is obtained by capturing or scanning an image of an object by said document camera.

5. A method according to claim 1 wherein said first area and said second area have the same size.

6. A method according to claim 1, further comprising a step of executing an electric panning operation to load a third portion of said first image data into said first area so as to show a third synthesis image frame having a size equal to the size of said frame buffer and consisting of a third part of said first image frame and said first part of said second image frame with said first-position partition line therebetween.

7. A method according to claim 1 wherein said first-position partition line is disposed exactly at the middle of said first synthesis image frame, and said second-position partition line is disposed right or left from the first-position partition line.

8. A method according to claim 1, further comprising a step of executing an electric panning operation to load a fourth portion of said first image data into said third area so as to show a fourth synthesis image frame having a size equal to the size of said frame buffer and consisting of a fourth part of said first image frame and said second part of said second image frame with said second-position partition line therebetween.

9. A method according to claim 1 wherein said image displaying device is a display or a digital projector coupled with a project screen.

* * * * *